(12) United States Patent
Landis et al.

(10) Patent No.: US 10,886,239 B2
(45) Date of Patent: Jan. 5, 2021

(54) CUSTOMISATION OF AN INTEGRATED CIRCUIT DURING THE REALISATION THEREOF

(71) Applicant: COMMISSARIAT A L'ENERGIE ATOMIQUE AUX ENERGIES ALTERNATIVES, Paris (FR)

(72) Inventors: Stefan Landis, Grenoble (FR); Hubert Teyssedre, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/667,332

(22) Filed: Oct. 29, 2019

(65) Prior Publication Data
US 2020/0135663 A1    Apr. 30, 2020

(30) Foreign Application Priority Data

Oct. 30, 2018 (FR) ..................................... 18 60030

(51) Int. Cl.
| | |
|---|---|
| *H01L 21/00* | (2006.01) |
| *H01L 23/00* | (2006.01) |
| *H01L 21/033* | (2006.01) |
| *H01L 21/311* | (2006.01) |
| *H01L 21/768* | (2006.01) |

(Continued)

(52) U.S. Cl.
CPC .......... *H01L 23/57* (2013.01); *H01L 21/0332* (2013.01); *H01L 21/31144* (2013.01); *H01L 21/76816* (2013.01); *H01L 21/76847* (2013.01); *H01L 21/76877* (2013.01); *H01L 23/5226* (2013.01); *H04L 9/3278* (2013.01); *H04L 2209/12* (2013.01)

(58) Field of Classification Search
CPC ... H04L 9/3278; H04L 2209/12; G06F 21/72; G06F 21/73; H01L 23/57; H01L 23/5226
USPC ......... 257/787, 789, 795, 798; 438/106, 127
See application file for complete search history.

(56) References Cited

U.S. PATENT DOCUMENTS

| | | | |
|---|---|---|---|
| 8,953,330 B2* | 2/2015 | Shi ....................... | H05K 5/0208 361/748 |
| 10,216,484 B2* | 2/2019 | Peeters ................. | G11C 11/225 |

(Continued)

FOREIGN PATENT DOCUMENTS

EP    2 876 680 A2    5/2015

OTHER PUBLICATIONS

U.S. Appl. No. 16/013,350, filed Jun. 20, 2018, 2018/0375670 A1, May, M., et al.

(Continued)

*Primary Examiner* — S. V. Clark
(74) *Attorney, Agent, or Firm* — Oblon, McClelland, Maier & Neustadt, L.L.P.

(57) ABSTRACT

A method for securing an integrated circuit during the realization thereof, including the following steps: delimiting the integrated circuit into a first zone referred to as standard zone and into a second zone referred to as security zone, forming of a set of vias in the security zone, and introducing of a layer loaded with contaminant particles configured to randomly obstruct a portion of the vias, thus forming a random interconnection structure in the security zone, the random interconnection structure creating a physical unclonable function.

12 Claims, 5 Drawing Sheets

(51) Int. Cl.
*H01L 23/522* (2006.01)
*H04L 9/32* (2006.01)

(56) References Cited

U.S. PATENT DOCUMENTS

| | | | |
|---|---|---|---|
| 2012/0140929 A1* | 6/2012 | Clark | H01L 23/49833 |
| | | | 380/277 |
| 2014/0042627 A1 | 2/2014 | Edelstein et al. | |
| 2014/0203448 A1 | 7/2014 | Song et al. | |
| 2015/0084193 A1 | 3/2015 | Feng et al. | |
| 2015/0235964 A1 | 8/2015 | Feng et al. | |
| 2015/0381659 A1* | 12/2015 | Khazan | H04L 63/0428 |
| | | | 726/1 |
| 2016/0255154 A1* | 9/2016 | Kim | H04L 63/1433 |
| | | | 726/25 |

OTHER PUBLICATIONS

French Preliminary Search Report dated Jul. 9, 2019 in French Application 18 60030 filed on Oct. 30, 2018 (with English Translation of Categories of Cited Documents).

Blaise Gassend, et al., "Silicon Physical Random Functions", Proceedings of the Computer and Communications Security Conference, Nov. 2002, 14 pages.

Sandeep S. Kumar, et al., "Extended Abstract: The Butterfly PUF Protecting IP on every FPGA", ; Workshop on Cryptographic Hardware and Embedded Systems (CHES), Sep. 2007, 4 pages.

Ryan Helinski, et al., "A Physical Unclonable Function Defined Using Power Distribution System Equivalent Resistance Variations", DAC 2009, Jul. 26-31, 2009, 6 pages.

\* cited by examiner

CUSTOMISATION OF AN INTEGRATED CIRCUIT DURING THE REALISATION THEREOF

TECHNICAL FIELD

The present invention relates to the field of securing integrated circuits, in particular by physical unclonable functions.

Prior Art

Currently, counterfeiting of integrated circuits poses a major problem for manufacturers and users. To combat this counterfeiting, it is sought to find means for discriminating between a legitimate circuit and a counterfeit circuit.

A first solution would consist in assigning a unique identifier for each integrated circuit and in compiling a database of legitimate identifiers. This solution is not very viable because it is rather simple to emulate (or replay) a valid identifier by means of a hardware or software lock.

A more effective solution consists in using a challenge-response mechanism that makes it possible to carry out an authentication by protecting from the attack via emulation (replay). This technique is based on the use of a function for calculating the response from the challenge. The function has to be unique for each integrated circuit and unclonable. Indeed, an attacker must not be able to physically recreate or to clone such a function. This type of function is called PUF (Physical Unclonable Function).

Known from prior art are integrated circuits that comprise different types of PUFs that make use of the functional dispersions inherent to the circuits.

A first technique of PUFs makes use of the induced variability on the propagation times of the signals to the limits of the electronic constraints of the circuit. A first example is an integrated circuit that comprises an arbitrator PUF consisting in inserting electrical signals as input of a long path of combinatorial circuits and in detecting the fastest signal. A race is established in the circuit between the various signals that are propagating according to different combinatorial paths and the signal that arrives first is detected by the arbitrator. The electrical signals as input define the challenge and the signal detected first defines the response.

Another example is the ring oscillator PUF described in the document of Gassend et al. entitled "Silicon Random Functions"; *proceedings of the Computer and Communications Security Conference*, November 2002. This PUF is comprised of several delay loops oscillating at specific frequencies and which control counters. The loops are arranged identically but the inherent technological dispersions lead to loops with slightly different frequencies. Thus, the counters controlled by the loops are used to produce the response bits to a challenge.

A second technique of PUFs makes use of the instabilities at start-up. For example, SRAM memories, already present in a large majority of circuits, can be used as PUFs. The basic principle is to recover the state of the memory at start-up which is normally unique. On the same principle, the PUF can be implemented by butterfly circuits produced using matrices of two crossed locks where the state of the memory point at start-up is undetermined. This technique is described in the document of Kumar et al. entitles "The Butterfly PUF: Protecting IP on every FPGA; *Workshop on Cryptographic Hardware and Embedded Systems (CHES)*, September 2007, Vienna. Of the same type, there are also bistable ring circuits composed of an odd number of inverters and also having an undetermined state at start-up.

A third technique of PUFs makes use of the technological dispersions of the resistances in a circuit. Such a technique is described in the document of R Helinski et al. entitled "A Physical Unclonable Function Defined Using Power Distribution System Equivalent Resistance Variations"; *DAC* 2009. More particularly, the authors propose to measure the drop in voltage in an integrated circuit between power supply planes and ground planes due to the technological dispersions of the resistances defined by the conductive tracks and the conductive tracks and the interconnections of the circuit. The drop in voltage is proportional to the current measured in short-circuit inverters arranged over the entire surface of the circuit.

However, all of the PUFs described hereinabove are based on operating at the limits of the electronic constraints of the circuits and are consequently, highly sensitive to the environmental variations. In particular, changes in temperature, supply voltages or electromagnetic interferences can affect their performance by decreasing their robustness and by increasing their volatility (i.e. their intra-circuit variability). Thus, for a constant challenge, the PUF can return different results according to the environmental conditions which implies the fact that a legitimate circuit can possibly be declared as being counterfeit.

Another problem relates to the ageing of the integrated circuit. Indeed, due to an operation at the limits of the electronic constraints, the slightest little defect that can arise during the ageing of the circuit causes the PUF to no longer respond in the same way and consequently, the integrated circuit can no longer be defined.

In order to overcome these defects, it is often necessary to add to the PUF a post-processing circuit of the response received which is costly in terms of footprint and consumption.

There is another technique described in document US2014/0042627 that consists in using a two-phase copolymer that is polymerised directly on the integrated circuit in order to form particles that make it possible to create electrical contacts according to different resistance values.

However, this type of polymerisation depends on the geometry and on the nature of the layer whereon the copolymer is deposited and does not provide a very random nature of the distribution of the resistive values.

The object of the present invention is to propose a method for customising or for securing an integrated circuit that overcomes the aforementioned disadvantages, in particular by realising a PUF with a very random nature that does not depend on the geometry and on the nature of the layers of the integrated circuit while still being practically insensitive to the variations in the environmental conditions with the adding of a costly post-processing circuit, and without the introduction of notable modifications in the method of manufacture of the circuit.

DISCLOSURE OF THE INVENTION

This objective is achieved with a method for securing an integrated circuit during the realisation thereof, said method comprising the following steps:
  delimiting of said integrated circuit into a first zone referred to as standard zone and into a second zone referred to as security zone,
  introducing of a layer of resin loaded with contaminant particles configured to randomly obstruct during a step of etching of the security zone a portion of the vias provided in said security zone thus forming a random set of vias, and metalizing of said random set of vias of the security zone in order to form a random interconnection structure that defines a physical unclonable function.

This makes it possible to identify and to secure the integrated circuit in a manner that is robust and insensitive to the variations in environmental conditions. Contrary to prior art, this method does not make use of non-controlled means in the electrical operation of the circuit but in the hardware realisation of the interconnection structure itself while still being independent of the geometry and of the nature of the layers of the integrated circuit and by introducing only a minimum number of additional steps in relation to a standard method of manufacture. In addition, due to the fact that the realisation of the random interconnection structure is not controlled, the cost of cloning becomes excessively high and retro-engineering, through imaging as well as learning, is extremely difficult.

Advantageously, the contaminant particles are nanoparticles formed from a material of the dielectric or metallic type selected from the following materials: silicon, silicon dioxide SiO2, silicon, metal TiN.

This makes it possible to have particles compatibles with the layer loaded with contaminant particles while still be adapted to be used in a white room.

Advantageously, the contaminant particles have a diameter that is substantially greater than or equal to that of the vias.

This makes it possible to minimise the number of partially obstructed vias. Note that the size of the particles can also be invariably larger or smaller than the vias.

Advantageously, the contaminant particles have a concentration between about 0.1% to 20% by mass selected according to the size of the particles.

This makes it possible to have a concentration that is sufficiently low to not obstruct all of the vias while still obstructing an optimum number of these vias.

Advantageously, the securing of the integrated circuit is integrated on the realisation of the first vias and comprises the following steps:

realising a first level of conductive patterns on the surface of said standard and security zones, depositing on the surface of the first level of conductive patterns of a first multilayer comprising a metal diffusion barrier as well as an etching mask, depositing on the surface of the first multilayer of a second multilayer of photosensitive resin comprising said layers loaded with contaminant particles, optical lithography in the security zone for insulating the vias provided in this security zone, with the standard zone remaining protected by the second multilayer, transferring of the vias of the security zone non-obstructed or obstructed by contaminant particles in the etching mask, cleaning of the surface of the standard and security zones in order to remove the second multilayer.

The various steps hereinabove show that the random portion is in the method of manufacture and not in the different masks or etchings. Furthermore, all of the successive steps are regulated and controlled in order to provide an extremely low variability of the key operating parameters of the integrated circuits.

Advantageously, the second multilayer comprises a first layer of etching mask of the organic carbon layer type "SOC", a second layer of etching mask of the silicon-enriched organic layer type "SiARC" and a third layer of photosensitive resin, the contaminant particles being comprised in said first layer of etching mask SOC.

This makes it possible to further reduce the number of steps while still providing a very random nature.

The method further comprises the following steps:

depositing on the surface of the standard and security zones of at least one third multilayer of photosensitive resin, optical lithography in the standard zone for insulating the vias provided in the standard zone, transferring of the vias of the standard zone in the etching mask, re-cleaning of the surface of the standard and security zones in order to remove the third multilayer of photosensitive resin, transferring in the metal diffusion barrier layer and filling by a metal of the vias in the standard and security zones, and realising of a second level of conductive patterns on the surface of the standard and security zones.

Advantageously, the method comprises an application of a voltage greater than a reading voltage in order to break down fragile partial vias.

This makes it possible to suppress the fragile contacts and thus to practically suppress any variation by ageing.

Advantageously, the random interconnection structure models a random electrical continuity that can be queried by a challenge-response authentication protocol, said random interconnection structure being formed between at least two corresponding levels of conductive patterns, with a portion of the conductive patterns being configured to receive a challenge, while another portion of the conductive patterns is configured to supply the response to said challenge.

This makes it possible to realise a very secure and protected authentication against attacks via replay.

Advantageously, the method comprises the realisation of a plurality of random interconnection structures and of a plurality of corresponding levels of conductive patterns.

This makes it possible to further secure the integrated circuit by the challenge-response technique.

According to another embodiment of the present invention, the securing of the integrated circuit is realised at the manufacturing of logic circuits (front-end).

The invention also relates to a secure integrated circuit that can be obtained using a method according to the invention.

BRIEF DESCRIPTION OF THE DRAWINGS

The present invention shall be better understood when reading the description of embodiments given purely for the purposes of information and in a non-limiting way, in reference to the accompanied drawings wherein.

DETAILED EXPOSURE OF PARTICULAR EMBODIMENTS

The concept at the basis of the invention is the random and voluntary obstruction of vias during the realisation thereof of a metal interconnection level by the controlled introduction of a layer loaded with a particulate contaminant.

Figure 1A:
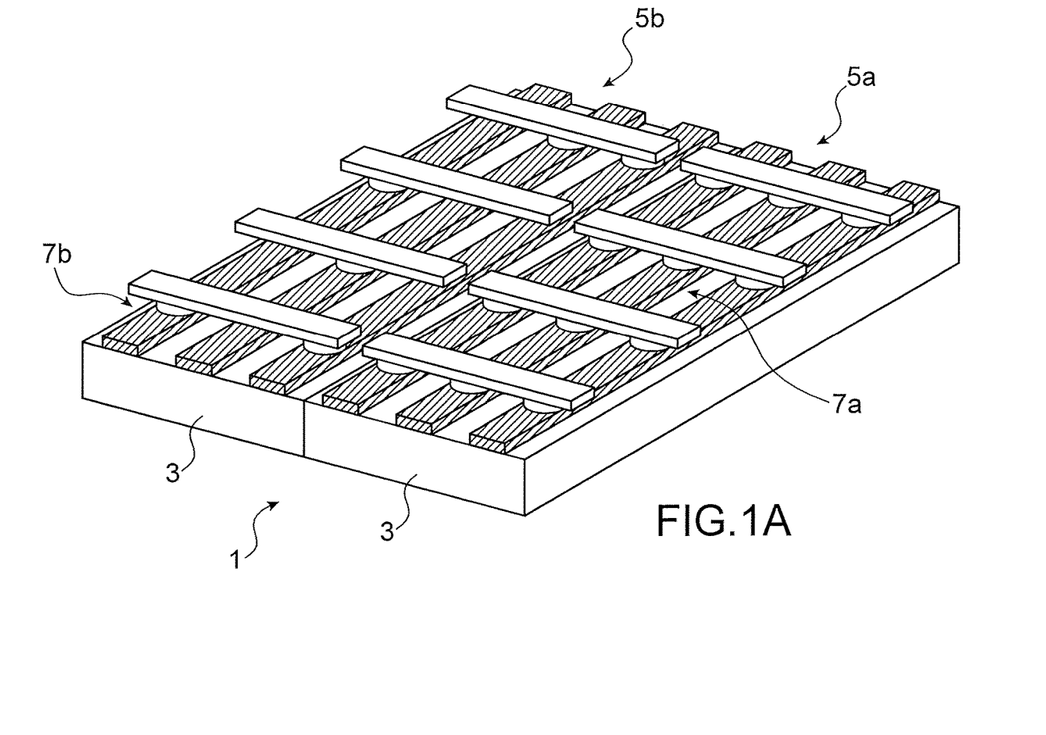
FIGS. 1A and 1B very diagrammatically show a method for securing an integrated circuit, according to an embodiment of the invention.
Figure 1B:
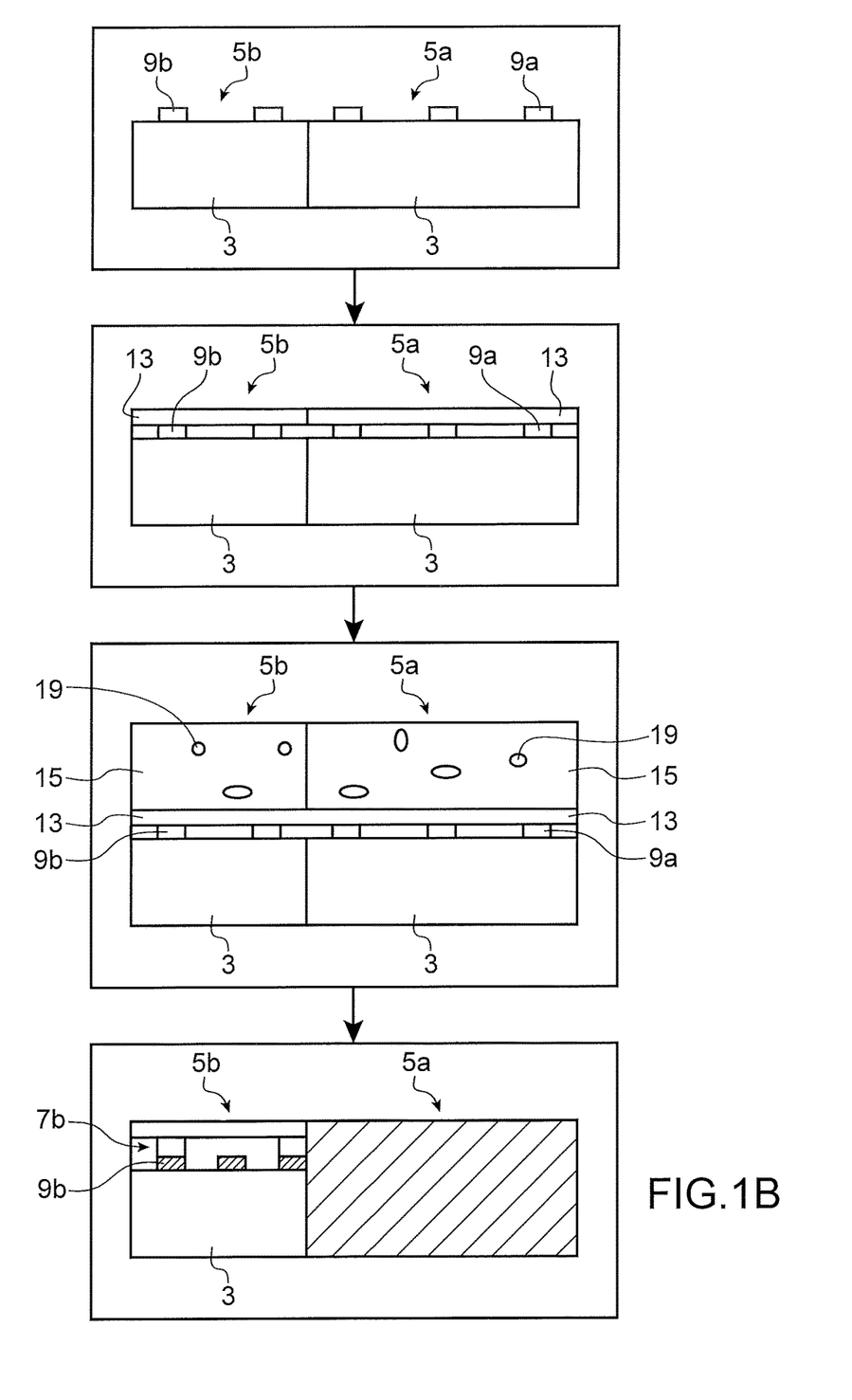

FIGS. 1A and 1B very diagrammatically show a method of securing an integrated circuit, according to an embodiment of the invention.

The method of securing according to the invention is perfectly integrated into the method of manufacture as is of the integrated circuit 1 on a silicon wafer 3. In the method of manufacture, the patterns on the silicon wafer 3 are created according to a method of photo-repetition that renders each integrated circuit identical to the others. The set of successive steps are regulated and controlled in order to provide an extremely low variability of the functional parameters of the integrated circuits. However, the method of manufacture comprises steps of physical implementations that are intrinsically random introducing discernible characteristics that provide the uniqueness or the customisation of each integrated circuit 1 without modifying their initial functional parameters.

Indeed, during the normal realisation of the integrated circuit 1 (or electronic chip), the method of securing comprises the delimitation of the integrated circuit 1 in a first surface zone referred to as standard zone 5a and in a second surface zone referred to as security zone 5b. The standard zone 5a corresponds to the functional portion of the basic integrated circuit 1. This zone 5a is occupied by the basic electronic components coupled with metal interconnections 7a adapted to realise the particular functions of the circuit. On the other hand, the security zone 5b is occupied by a physical unclonable function PUF intended to secure the basic circuit.

The fact that the standard surface zone is separate from the surface security zone and that the two zones are at the same level makes it possible to facilitate the realisation of the steps on the two zones and to reduce the number of steps of the method. The example of the FIG. 1A shows the security circuit next to the functional circuit but of course, the two circuits can be arranged differently. For example, the security circuit can be on a central zone surrounded by the functional circuit. According to another example, the security circuit can be arranged on a corner of the functional circuit, etc.

FIG. 1B shows that after the delimitation of the zones 5a and 5b, a first level of conductive patterns 9a, 9b is realised on the surface of the standard 5a and security 5b zones.

A first multilayer 13 is then deposited on the surface of the first level 8 of conductive patterns 9a, 9b. The first multilayer 13 comprises a metal diffusion barrier as well as an etching mask. Then, a second multilayer 15 is deposited on the surface of the first multilayer 13. The second multilayer 15 comprises a layer of resin loaded with contaminant particles 19 configured to randomly obstruct during a step of etching of the security zone 5b a portion of the vias provided in said security zone 5b thus forming a random set of vias 17b.

The method further comprises a metalizing of the random set of vias 17b of the security zone 5b in order to form a random interconnection structure 7b that defines a physical unclonable function.

This random interconnection structure creates a physical unclonable function modelled by a random electrical continuity that can be queried by a challenge-response authentication protocol.

Figure 2:
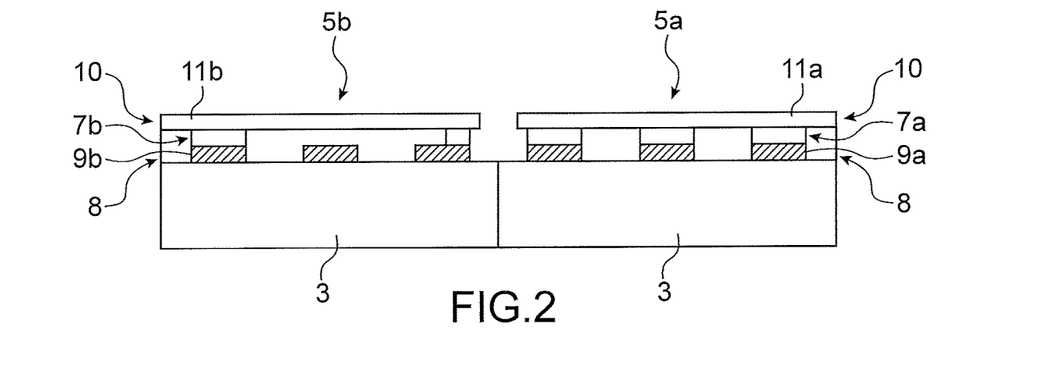
FIG. 2 very diagrammatically shows a cross-section view of a secure integrated circuit realised by the method of securing according to an embodiment of the invention.

FIG. 2 very diagrammatically shows a cross-section view of a secure integrated circuit realised by the method of securing according to an embodiment of the invention.

The secure integrated circuit (or secure electronic chip) thus comprises a standard zone 5a and a security zone 5b. The standard zone 5a normally comprises at least two levels of conductive tracks 9a and 11a connected via metal interconnections 7a to the different electronic components (not shown) of the integrated circuit 1.

The security zone 5b comprises a random interconnection structure 7b formed between at least two levels 8 and 10 of corresponding conductive patterns 9b and 11b adapted to test the electrical continuity of this random interconnection structure 7b. Note that the conductive patterns 9b and 11b can be of any shape or configuration according to the complexity sought. For example, the conductive patterns 9b and 11b can be formed by a set (for example, a few tens) of crossed conductive grids or tracks or of any other form. Advantageously, the security zone 5b can comprise a plurality of random interconnection structures 7b (only one is shown) and a plurality of corresponding levels of conductive patterns (only two levels are shown) thus making it possible to increase the complexity of the PUF.

The random interconnection structure or structures 7b model an electrical continuity between the different conductive patterns that can be used to apply a challenge-response authentication protocol. More particularly, a portion of the conductive patterns 9b and 11b is configured to receive a stimulus defining a challenge, while another portion of the conductive patterns 9b and 11b is configured to provide an output signal corresponding to the response to the challenge. The response thus depends on the electrical continuity of the random interconnection structure proper to the electronic chip as well as to the challenge used. The conductive patterns receiving the stimulus form an input of the integrated circuit while those that supply the response form the output of the integrated circuit. The conductive patterns selected to form the input or the output are predetermined according to the specifications of the authentication protocol.

Each integrated circuit 1 coming from the method of securing thus has in its security zone 5b a unique physical interconnection structure 7b of which the process of manufacture is random and not controlled and consequently, excessively difficult to clone.

After the realisation of the secure integrated circuits, we proceed with an enrolment phase which consists in compiling a database containing legitimate "challenge-response" pairs for each integrated circuit 1. Concretely, for each integrated circuit 1, a tester randomly generates a certain number N of challenges C and sends them to the integrated circuit 1. Each challenge C is formed of a stimulus which is applied to the input of the integrated circuit 1 and the response R to each challenge C is recovered at the output of the integrated circuit 1. Indeed, the PUF that defines a secrete function F calculate the response R to each challenge C (i.e. R=F(C)). The tester recovers the N responses R associated with the N challenges C and stores the N corresponding challenge-response (C, R) pairs in a database (not shown).

Thus, the authentication of a secure integrated circuit 1 can be tested all throughout its life cycle. More particularly, a user of an integrated circuit 1 can request from the manufacturer (or the entity that has the database of the challenge-response pairs) a challenge (or a challenge-response pair). The challenge C is applied to the integrated circuit 1 and the latter calculates the response R to the challenge C. Then, the user (or the manufacturer) compares the response R generated by the integrated circuit 1 with that stored in the database in order to verify the legitimacy of the integrated circuit 1. Note that, for more security, the challenge-response pair already used is then suppressed from the database in order to prevent any replay.

FIGS. 3A-3L very diagrammatically show steps of a method of securing an integrated circuit, according to a preferred embodiment of the invention.

Figure 3A:
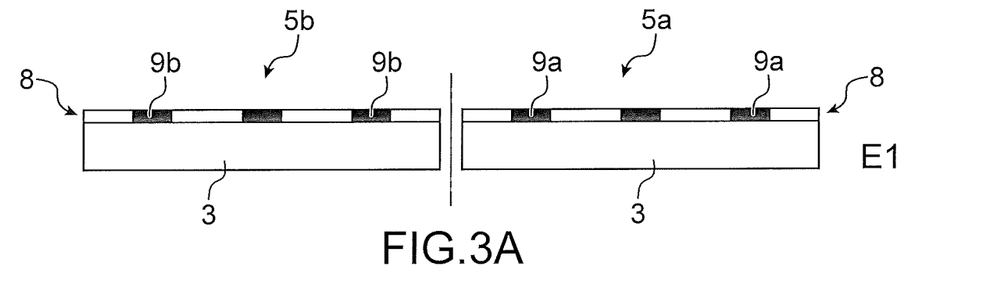
FIGS. 3A-3L very diagrammatically show steps of a method of securing an integrated circuit, according to a preferred embodiment of the invention.
Figure 3B:
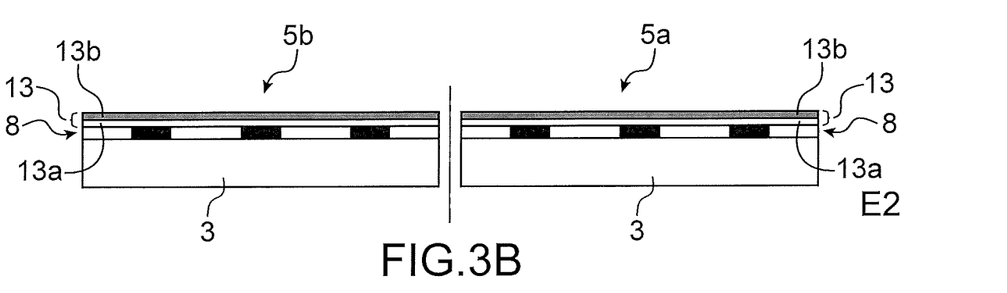

In a manner known to those skilled in the art, it is considered that the manufacture of the integrated circuit 1 on the standard zone 5a was realised beforehand according to the usual steps of preparing a layer of oxide on a substrate, of transferring the drawing of the circuit to be reproduced using a mask, etching, doping, realisation of following layers, etc.

Thus, we start with a wafer 3 delimited into a security zone 5b and a standard zone 5a of which all of the method of manufacture referred to as "front-end" has been realised, i.e. practically all of the circuit that is sought to be secured has been manufactured.

According to this embodiment, the securing of the integrated circuit 1 then begins at the end of the front-end and is integrated into the rest of the steps of the manufacturing of semi-conductor compounds on "back-end", i.e., during the realisation of the first electrical interconnections for adequately interconnecting the components together as well as with input-output electrodes.

FIG. 3A very diagrammatically shows a first step of the method for securing. The first step E1 (FIG. 3A) consists in realising a first level 8 of conductive patterns 9a and 9b on the surface of the standard 5a and security 5b zones of the wafer 3.

The conductive patterns 9a and 9b can be made of copper, aluminium or of another electrically-conductive material. Note that this step can be considered as a last step that is already realised on "front-end" of the method of manufacture of the integrated circuit.

The second step E2 (FIG. 3B) consists in depositing a first multilayer 13 on the surface of the first level 8 comprising the conductive patterns 9a and 9b. The first multilayer 13 comprises a metal diffusion barrier 13a as well as hard mask of etching 13b. This first multilayer 13 is for example a two-layer comprised of a layer of SiN that has the function of barrier 13a and of a layer of $SiO_2$ that has the function of an etching mask 13b.

The third step E3 (FIG. 3C) consists in depositing a second multilayer 15 of photosensitive resin that comprises contaminant particles 19 on the standard 5a and security 5b zones.

Figure 3C:
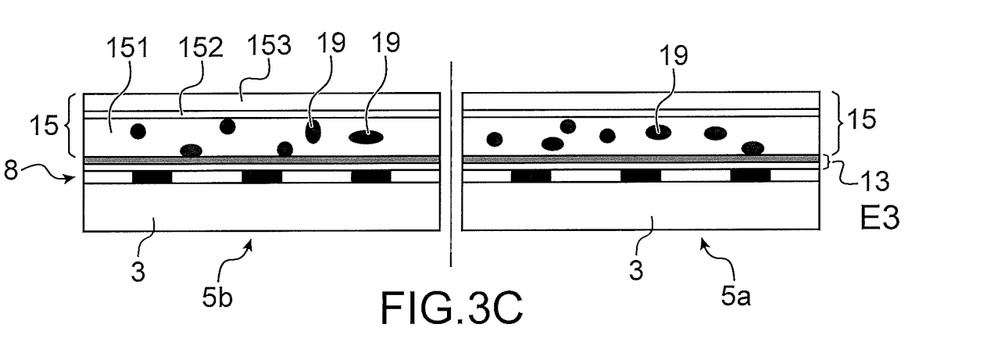

Advantageously, the second multilayer 15 consists in a stack of sub-layers that can be composed by way of example, of a first layer of etching mask of the organic carbon layer type SOC (Spin On Carbon) 151, of a second layer of etching mask of the silicon-enriched organic layer type SiARC (Silicon Anti Reflective Coating) 152 as well as a third layer of photosensitive resin 153. The thicknesses of these three layers can vary according to the nature of the products used as well as the dimensions of the vias referred to as "target vias". They are typically about 150 nm for the first layer SOC 151, of about 30 nm for the second layer SiARC 152 and of about 100 nm for the third layer of photosensitive resin 153. All of these layers 151, 152, 153 can be deposited by the known method of spin coating.

Advantageously, the contaminant particles 19 are added in the first layer of etching mask SOC 151 (referred to as polymer film or film of SOC) before the spin coating. The size, the shape and the material of the particles 19 are advantageously adequately chosen in order to optimise their distribution on the vias in the most random manner possible.

More particularly, the contaminant particles 19 are nanoparticles comprised of a material made from a dielectric, metal or polymer. By way of example, this material can be made from silicon Si, silicon dioxide $SiO_2$, $Al_2O_3$, silicon nitride or any other material compatible with the Front End methods. The size of the nanoparticles is chosen according to the dimension of the target vias, the latter having a generally cylindrical shape. More particularly, the nanoparticles 19 have a diameter that is substantially greater than or equal to that of the vias. Note that the size of the particles can also be invariably larger or smaller than the vias but in this case, it is the average value of the distribution of the sizes that is substantially greater than or equal to that of the vias.

Moreover, the nanoparticles 19 have a concentration that is sufficiently low between about 0.1% to 20% by mass selected according to the size of the particles. In these limits, the concentration practically does not modify the properties of the layers of the film of SOC 151 and furthermore makes it possible to have a distribution that is very homogeneous in this film 151. This makes it possible to deactivate an optimum number of vias without obstructing all of these vias. More particularly, the concentration of the nanoparticles 19 is adjusted according to the density of the patterns of the circuit and the proportion of the electrical interconnections that is sought to be suppressed.

Advantageously, the surface of the nanoparticles 19 is processed so that its surface physical-chemical properties are compatible with the chemical nature of the film of SOC 151. This makes it possible to increase the effectiveness of the method by optimising the dispersion of the nanoparticles 19 in the film 151 of polymer and by preventing the formation of the aggregates of particles in this film 151.

Note that the film of SOC 151 does not have any particular specificity for the steps of lithography and consequently, the adding of nanoparticles in this first layer 151 advantageously makes it possible to retain the same steps of lithography as in a standard method. Furthermore, the film of SOC 151 is rather thick and easily makes it possible to contain the nanoparticles 19. However, it is possible to insert them in the third layer of resin 153 or even in the thin second layer of SiArc 152.

The fourth step E4 (FIG. 3D) consists in proceeding with an optical lithography in the security zone 5b in order to insulate the vias 17b provided in this zone 5b. The resin is developed and the patterns are transferred in the SiArc.

Figure 3D:
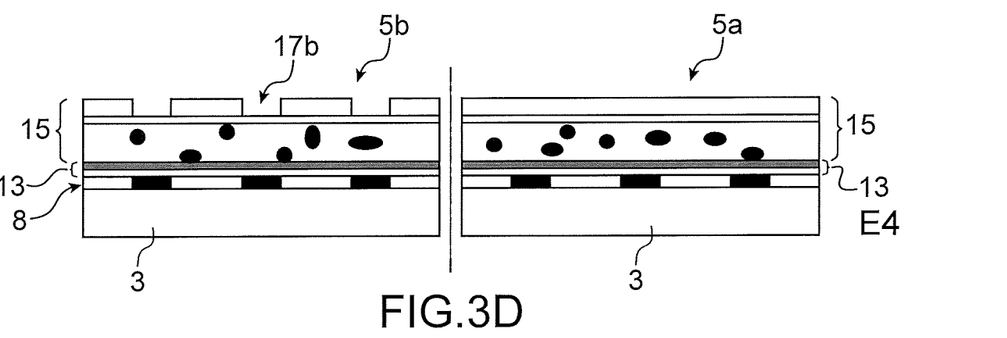
Figure 3E:
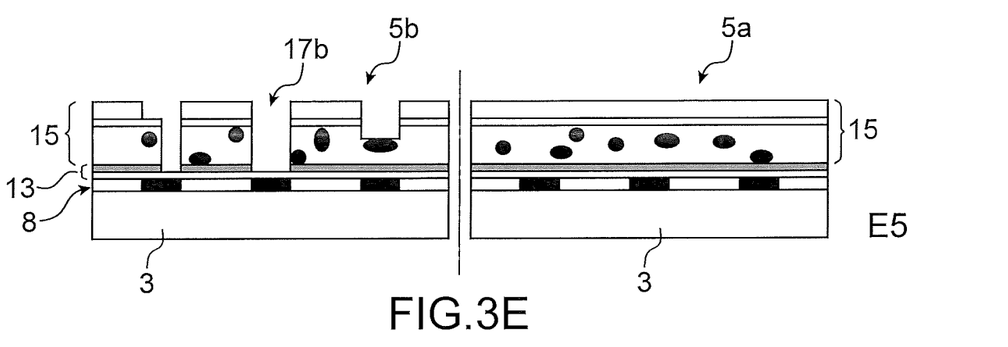

Alternatively, the lithography can be of the electronic, EUV, nano impression type or of any other type.

The standard zone 5a remains protected by the second multilayer 15 of photosensitive resin. Thus, the optical lithography is realised only on the security circuit. Thus, the particles 19 partially or entirely randomly obstruct a portion of the vias 17b of the security zone 5b. This random distribution of the nanoparticles in the layer of SOC will make it possible to partially or entirely stop the opening of the SOC during the etching step. This step shows well that the random nature is thus in the method of manufacture and not in different masks or etchings.

The fifth step E5 (FIG. 3E) consists in transferring the vias 17b obstructed or not obstructed in the etching mask. The film of SOC 151 loaded with nanoparticles 19 is open by a method of dry etching (for example, with an oxygen base) in order to reproduce the patterns realised in lithography. The chemical nature of the nanoparticles is chosen such that the plasma to open the SOC will not etch the nanoparticles. For example, if the plasma to open the SOC is substantially with an oxygen base, nanoparticles of the silicon Si, silicon dioxide $SiO_2$, $Al_2O_3$, or silicon nitride type. The nanoparticles can also be realised from metals compatible with the requirements of metal contaminations of the developed component.

At the end of the structuring of the security zone 5b, the sixth step E6 (FIG. 3F) consists in cleaning the surface of the standard 5a and security 5b zones so as to remove the second multilayer 15 of photosensitive resin and the contaminant particles 19. We again obtain a surface condition proper for the realisation of the lithography and etching in the standard zone.

Figure 3F:
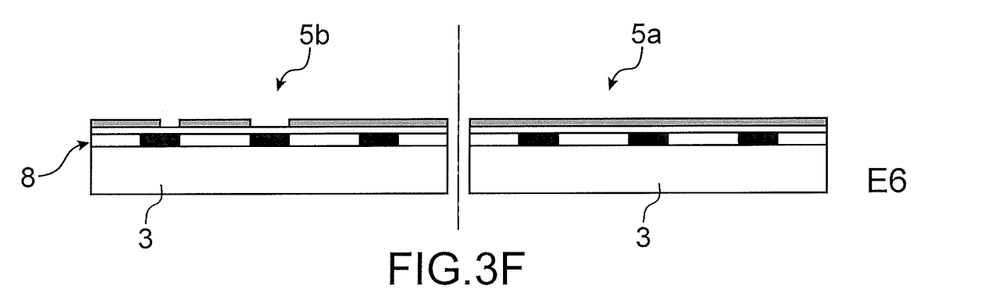
Figure 3G:
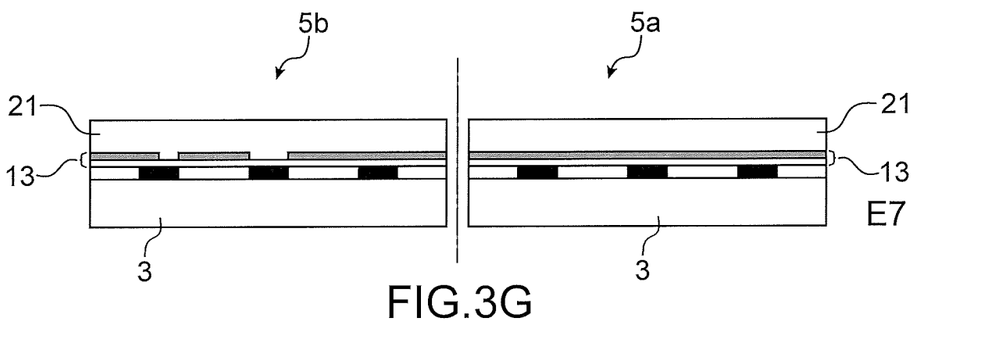
Figure 3H:
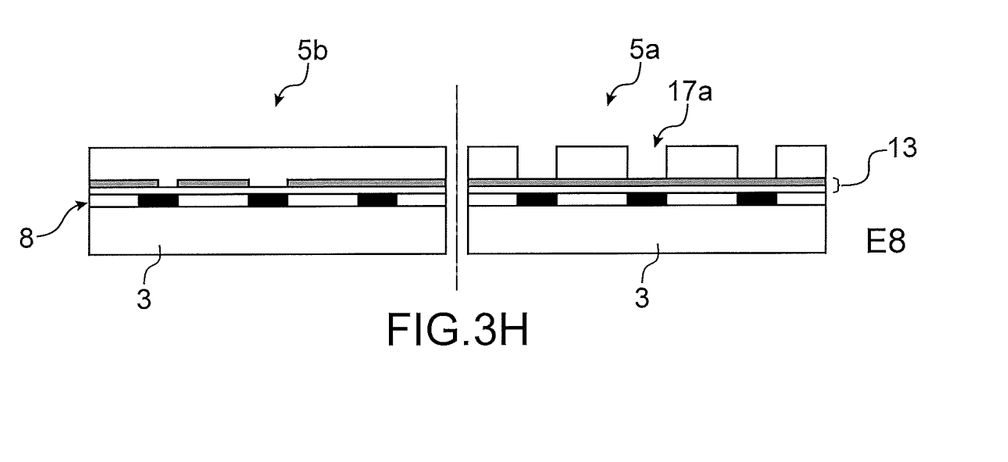
Figure 3I:
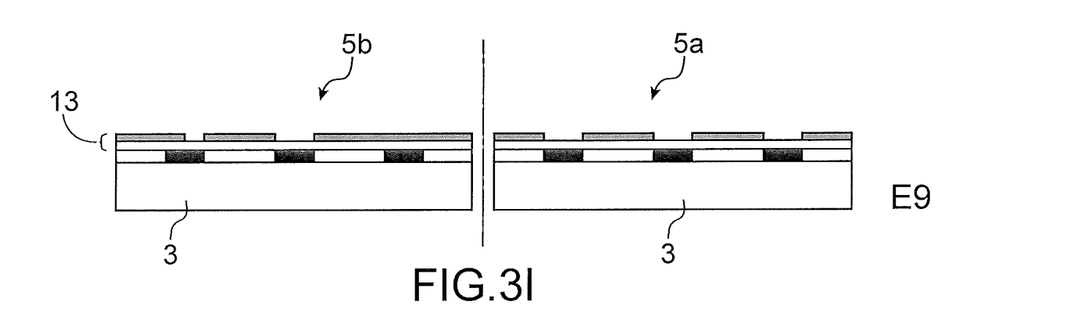
Figure 3J:
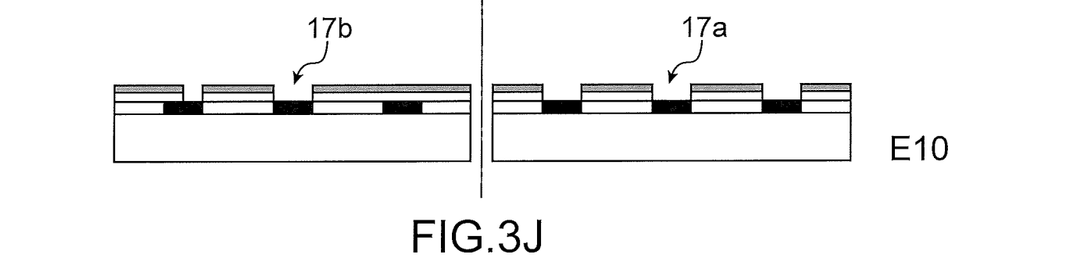
Figure 3K:
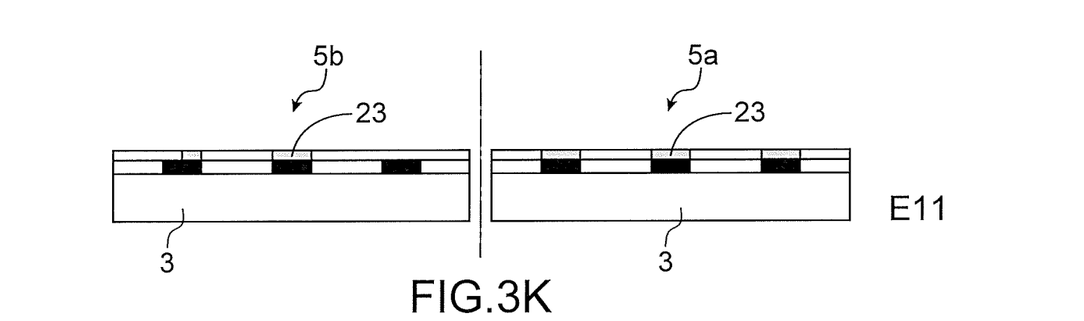

Advantageously, for the removal of the second multilayer 15, a dry etching method can be used that has good etching selectivity between the nanoparticles and the barrier layers. However, if the etching selectivity is not sufficient it is then possible to add a buffer barrier layer above those used for the method for realising metal tracks. This new buffer layer is made from a material of the dielectric or metal type that makes it possible to remove nanoparticles selectively. For example, if the nanoparticles have an SiO2 base a buffer layer of the SiN or TiN type can be used.

The seventh step E7 (FIG. 3G) includes the course of usual manufacture of the circuit as initially provided for in the standard zone 5a. Thus, at least one third multilayer (or layer) 21 of photosensitive resin is first deposited on the surface of the standard 5a and security 5b zones. Then, we proceed with an optical lithography in the standard zone 5a for insulating the vias 17a provided in this zone 5a.

The eighth step E8 (FIG. 3H) consists in transferring the vias 17a of the standard zone 5a in the etching mask. Thus, the surface of the standard 5a and of the security 5b zones is re-cleaned in order to remove the third multilayer 21 of photosensitive resin.

The nine and tenth steps E9-E10 (FIGS. 3I and 3J) consists in transferring the vias 17a and 17b of the standard zone 5a and of the security zone 5b in the metal diffusion barrier layer.

The eleventh step E11 (FIG. 3K) consists in filling the vias 17a and 17b with a metal 23 for example, with copper or aluminium. The filling can be carried out selectively in order to not fill the smallest openings.

The twelfth step E12 (FIG. 3L) consists in realising a second level of conductive patterns 11a, 11b on the surface of the standard 5a and security 5b zones respectively.

Figure 3L:
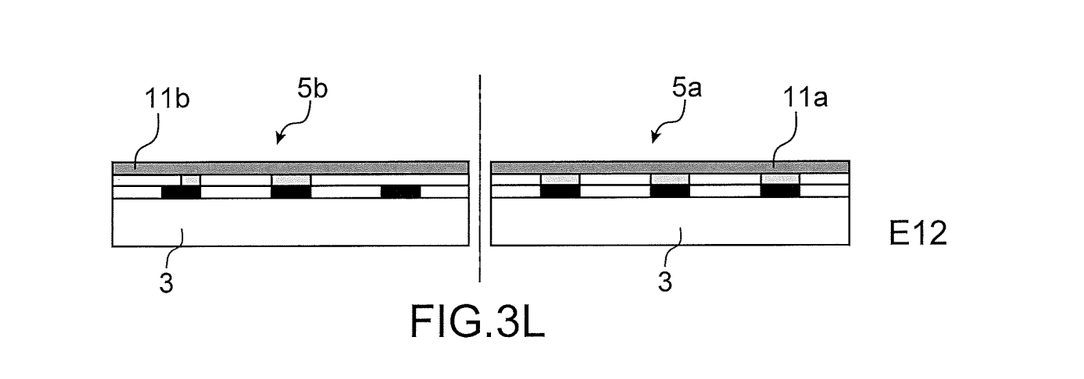

This embodiment shows that all of the successive steps are regulated and controlled in order to provide an extremely low variability of the key functionality parameters of the circuit in the standard zone 5a while still allowing by construction a non-controlled realisation of the random interconnection structure 7b in the security zone 5b. This reinforces the uniqueness of each electronic chip 1 that allows for the identification thereof in a very precise manner while still rendering the cloning extremely difficult.

Advantageously, in order to prevent any variation by ageing, we proceed with an electrical treatment in order to suppress the fragile partial interconnections in the security zone 5b. More particularly, a voltage greater than the reading voltage is applied in order to break down the very fine partial interconnections that have an excessively high resistance. Furthermore, in order to test the authenticity of an integrated circuit 1, it is possible to apply to it a challenge signal that has a very low current intensity which preserves the identity of the circuit all throughout its life cycle.

Note that the embodiment of the method of securing according to FIGS. 3A-3L can be transposed to the "Front End", i.e., during the manufacture of logic circuits.

The invention claimed is:

1. A method for securing an integrated circuit during realisation thereof, said method comprising the following steps:
    delimiting of said integrated circuit into a first zone referred to as standard zone and into a second zone referred to as security zone,
    introducing of a layer of resin loaded with contaminant particles configured to randomly obstruct during a step of etching of the security zone a portion of the vias provided in said security zone thus forming a random set of vias, and
    metalizing of said random set of vias of the security zone in order to form a random interconnection structure that defines a physical unclonable function.

2. The method according to claim 1, wherein the contaminant particles are nanoparticles formed from a material of the dielectric or metallic type selected from the following materials: silicon, silicon dioxide SiO2, silicon, metal TiN.

3. The method according to claim 1, wherein the contaminant particles have a diameter that is substantially greater than or equal to that of the vias.

4. The method according to claim 1, wherein the contaminant particles have a concentration between about 0.1% to 20% by mass selected according to the size of the particles.

5. The method according to claim 1, wherein the securing of the integrated circuit is integrated on the realisation of the first vias and further comprises the following steps:
    realising a first level of conductive patterns on the surface of said standard and security zones,
    depositing on the surface of the first level of conductive patterns of a first multilayer comprising a metal diffusion barrier as well as an etching mask,
    depositing on the surface of the first multilayer of a second multilayer of photosensitive resin comprising said layers loaded with contaminant particles,
    optical lithography in the security zone for insulating the vias provided in this security zone, with the standard zone remaining protected by the second multilayer,
    transferring of the vias of the security zone non-obstructed or obstructed by contaminant particles in the etching mask,
    cleaning of the surface of the standard and security zones in order to remove the second multilayer.

6. The method according to claim 5, wherein the second multilayer comprises a first layer of etching mask of the carbon-enriched organic layer type SOC, a second layer of etching mask of the silicon-enriched organic layer type SiARC and a third layer of photosensitive resin, the contaminant particles being comprised in said first layer of etching mask SOC.

7. The method according to claim 6, further comprising the following steps:
    depositing on the surface of the standard and security zones of at least one third multilayer of photosensitive resin,
    optical lithography in the standard zone for insulating the vias provided in the standard zone,
    transferring of the vias of the standard zone in the etching mask,
    re-cleaning of the surface of the standard and security zones in order to remove the third multilayer of photosensitive resin,
    transferring in the metal diffusion barrier layer and filling by a metal of the vias in the standard and security zones, and realising of a second level of conductive patterns on the surface of the standard and security zones.

8. The method according to claim 1, wherein an application of a voltage greater than a reading voltage in order to break down fragile partial vias.

9. The method according to claim 1, wherein the random interconnection structure models a random electrical continuity that can be queried by a challenge-response authentication protocol, said random interconnection structure being formed between at least two corresponding levels of conductive patterns, with a portion of the conductive patterns being configured to receive a challenge, while another portion of the conductive patterns is configured to supply the response to said challenge.

10. The method according to claim 1, wherein the realisation of a plurality of random interconnection structures and of a plurality of corresponding levels of conductive patterns.

11. The method according to claim 1, wherein the securing of the integrated circuit is realised at the manufacturing of logic circuits.

12. A secure integrated circuit, comprising:
a first zone referred to as standard zone comprising at least two levels of conductive tracks connected via metal interconnections to electronic components,
a second zone referred to as security zone comprising a random interconnection structure formed between at least two levels of corresponding conductive patterns adapted to test the electrical continuity of said random interconnection structure and thus defining a physical unclonable function.

* * * * *

UNITED STATES PATENT AND TRADEMARK OFFICE
CERTIFICATE OF CORRECTION

PATENT NO. : 10,886,239 B2
APPLICATION NO. : 16/667332
DATED : January 5, 2021
INVENTOR(S) : Stefan Landis et al.

Page 1 of 1

It is certified that error appears in the above-identified patent and that said Letters Patent is hereby corrected as shown below:

On the Title Page

Item (71), the Applicant's information is incorrect. Item (71) should read:
--(71) Applicant: COMMISSARIAT A L'ENERGIE ATOMIQUE ET AUX ENERGIES ALTERNATIVES, Paris (FR)--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*